United States Patent
Hirata

(10) Patent No.: US 6,685,356 B2
(45) Date of Patent: Feb. 3, 2004

(54) LIQUID BEARING UNIT AND MAGNETIC DISK DEVICE USING THE SAME

(75) Inventor: Katsushi Hirata, Saijo (JP)

(73) Assignee: Matsushita Electric Industrial Co., Ltd. (JP)

( * ) Notice: Subject to any disclaimer, the term of this patent is extended or adjusted under 35 U.S.C. 154(b) by 63 days.

(21) Appl. No.: 10/115,437

(22) Filed: Apr. 4, 2002

(65) Prior Publication Data

US 2002/0173431 A1 Nov. 21, 2002

(30) Foreign Application Priority Data

Apr. 4, 2001 (JP) ........................................ 2001-105292

(51) Int. Cl.[7] ............................. F16C 32/06; F16C 33/10
(52) U.S. Cl. ........................................ 384/100; 384/132
(58) Field of Search ............................... 384/100–124, 384/130, 132

(56) References Cited

U.S. PATENT DOCUMENTS 5,427,456 A * 6/1995 Hensel ........................ 384/112
5,516,212 A * 5/1996 Titcomb ....................... 384/107
5,768,784 A * 6/1998 Williams et al. ............. 384/100
5,977,676 A * 11/1999 Wijdenes ....................... 310/90

FOREIGN PATENT DOCUMENTS

| JP | 5-215778 | * | 8/1993 |
| JP | 8-170734 | * | 7/1996 |
| JP | 2000-330065 | * | 11/2000 |

* cited by examiner

*Primary Examiner*—Thomas R. Hannon
(74) *Attorney, Agent, or Firm*—Parkhurst & Wendel, L.L.P.

(57) ABSTRACT

A highly reliable liquid bearing unit is provided, which can, by securely repelling a lubricant by an oil repelling film, prevent the lubricant from leaking and a magnetic disk device mounted therewith. In a case where the lubricant contains a constituent of at least one of a hydrocarbon-based oil and an ester-based oil and the oil repellent film is a film of at least one of a fluorine base and a silicone base, surface tension of the lubricant is made greater than the critical surface tension of the oil repellent film by 5 mN/m or more. Moreover, when the lubricant is a fluorine-based lubricant, surface tension of the lubricant is made greater than the critical surface tension of the oil repellent film by 8 mN/m or more.

7 Claims, 4 Drawing Sheets

LIQUID BEARING UNIT AND MAGNETIC DISK DEVICE USING THE SAME

TECHNICAL FIELD

The present invention relates to a dynamic pressure-type liquid bearing unit used in a spindle motor or the like and a magnetic disk device mounted with the same, and in particular, it relates to a means for preventing a lubricant from leaking.

BACKGROUND ART

FIG. 5 shows a prior-art liquid bearing unit.

One end of a stationary shaft 2 with dynamic pressure-generating grooves 4a and 4b formed on the outer circumferential surface thereof is press-fitted into a base 1, and on the other end thereof, a thrust plate 3 is fitted, thus a shaft portion is formed. A sleeve 5 is press-fitted to the inner circumferential surface of a hub 6 for attachment of a magnetic disk or the like, and a thrust flange 11 is attached to one end of this sleeve 5, thus a rotator is formed. Moreover, the stationary shaft 2 is inserted into a bearing hole of the sleeve 5 so that the thrust flange 11 and thrust plate 3 are opposed to each other, and a lubricant 10 is filled between the shaft portion and rotator, thus the rotator is rotatably supported by the shaft portion.

A stator coil 9 is provided on a wall formed on a base 1, a rotor magnet 7 is attached via a rotor yoke 8 to a surface of the hub 6 opposed to the stator coil 9, thus a motor driving portion is constructed.

When the sleeve 5 and the hub 6 are driven to rotate by this motor driving portion, a dynamic pressure is generated in the lubricant 10 by pumping action of the dynamic pressure-generating grooves 4a and 4b formed on the stationary shaft 2, and the shaft portion and the rotator are supported to rotate without contact.

The lubricant 10 filled between the shaft portion and rotator is retained inside the bearing by surface tension, however, if the lubricant 10 scatters or oozes out due to a rotating drive of the bearing unit, a rotation failure of the bearing or contamination to the exterior occurs. In order to prevent such a leak of the lubricant 10, an oil repellent film 12 having the property to repel the lubricant 10 is formed on the lower end surface of the sleeve 5.

This oil repellent film 12 has been formed from a point of view where a film that moderately repels the lubricant 10 suffices, and the ability to repel the lubricant 10 (hereinafter, referred to as "repelling ability") has not been particularly regarded as important. For example, in a liquid bearing unit used in an optical disk device, fluorine-based lubricant 10 which is excellent in heat resistance and chemical stability and whose change in kinematic viscosity according to temperature is small has been used, and as the oil repellent film 12, a silicone-based oil repellent film 12 which easily repels this fluorine-based lubricant 10 has been used.

However, with the realization of high-speed rotation of bearing units in recent years, in a liquid bearing unit provided with the above prior-art oil repellent film 12, surface tension of the lubricant 10 has declined due to a rise in temperature as a result of heat generation from the motor portion and frictional heat in the bearing portion and an increase in centrifugal force to be applied to the lubricant 10 has become remarkable. Therefore, in the prior-art liquid bearing unit, it has been impossible to sufficiently prevent a leak of the lubricant 10 from the bearing, this has induced scattering or oozing of the lubricant 10, thus easily causing a rotation failure of the bearing and contamination to the exterior.

In addition, such a liquid bearing unit using the silicone-based oil repellent film 12 as in the above has a problem such that this can be mounted on an optical disk device, but cannot be applied to a magnetic disk device. This is because if the liquid bearing unit using the silicone-based oil repellent film 12 is mounted on a magnetic disk device, polysiloxane and the like which is generated from the silicone film adsorbs to a magnetic disk or a head and exerts negative influences on the sliding movement thereof, which may cause a reading/writing error or a head crash.

It is an object of the present invention to solve the above problems and provide a highly-reliable liquid bearing unit which can prevent a lubricant from leaking by securely repelling the lubricant by an oil repellent film, and a magnetic disk mounted with the same.

DISCLOSURE OF THE INVENTION

A liquid bearing unit of the present invention is characterized by a construction such that combinations of a lubricant and an oil repellent film are controlled and surface tension of the lubricant becomes greater than the critical surface tension of the oil repellent film by an appropriate value.

According to the present invention, even when a rise in temperature or an increase in centrifugal force occurs in the bearing portion due to high-speed rotation, a leak of the lubricant can be reduced by maintaining the repellent ability of the oil repellent film.

A magnetic disk device of the present invention is characterized by a special construction for a lubricant and an oil repellent film.

According to the present invention, a highly reliable magnetic disk device without a reading/writing error or a head crash can be realized.

A first mode according to the present invention is a liquid bearing unit in which a lubricant is filled between a shaft portion and a rotator which is rotatably supported by this shaft portion and an oil repellent film for preventing the lubricant from leaking is formed on the shaft portion or rotator in the vicinity of a gas-liquid interface of the lubricant, wherein the lubricant contains a constituent of at least one of a hydrocarbon-based oil and an ester-based oil, the oil repellent film is a film of at least one of a fluorine base and a silicone base, and surface tension of the lubricant is made greater than the critical surface tension of the oil repellent film by 5 mN/m or more. Thus, by providing a fixed difference or mode between the critical surface tension of the oil repellent film and surface tension of the lubricant, despite a decrease in the surface tension of the lubricant due to a rise in temperature as a result of heat generation from the motor portion and frictional heat in the bearing portion and an increase in centrifugal force due to high-speed rotation, scattering or oozing of the lubricant can be securely prevented, whereby a highly reliable liquid bearing unit can be realized.

A second mode according to the present invention is a fluid bearing unit in which a lubricant is filled between a shaft portion and a rotator which is rotatably supported by this shaft portion and an oil repellent film for preventing the lubricant from leaking is formed on the shaft portion or rotator in the vicinity of a gas-liquid interface of the lubricant, wherein the lubricant is a fluorine-based lubricant, and surface tension of the lubricant is made greater than the critical surface tension of the oil repellent film by 8 mN/m or more. Thus, by providing a fixed difference or mode between the critical surface tension of the oil repellent film and the surface tension of the lubricant, despite a decrease in the surface tension of the lubricant due to a rise in temperature as a result of heat generation from the motor portion and frictional heat in the bearing portion and an increase in centrifugal force due to high-speed rotation, scattering or oozing of the lubricant can be securely prevented, whereby a highly reliable fluid bearing unit can be realized.

In addition, in the fluid bearing unit according to the second mode, when the fluorine-based lubricant contains at least one of perfluoropolyether and perfluoropolyether derivatives, a fluid bearing unit which withstands use in a high temperature range and whose torque change according to temperature is small can be realized. In addition, when the oil repellent film is a coating film, an oil repellent film can be easily formed at low cost, and moreover, by dispersing and dissolving various materials in the coating solution, other functions can be easily added after formation of the oil repellent film. Furthermore, when the oil repellent film is a fluorine-based film, a fluid bearing unit which can also be mounted on a magnetic disk device can be realized.

A third mode according to the present invention is a magnetic disk device mounted with a fluid bearing unit in which a lubricant is filled between a shaft portion and a rotator which is rotatably supported by this shaft portion and an oil repellent film for preventing the lubricant from leaking is formed on the shaft portion or rotator in the vicinity of a gas-liquid interface of the lubricant, wherein the lubricant is a fluorine-based lubricant, the oil repellent film is a fluorine-based film, and surface tension of the lubricant is made greater than the critical surface tension of the oil repellent film by 8 mN/m or more. Thus, a highly reliable magnetic disk device without a reading/writing error or a head crash can be realized.

PREFERRED EMBODIMENTS OF THE INVENTION

Hereinafter, with reference to FIG. 1 through FIG. 4, respective embodiments of the present invention will be described in detail based on concrete examples.

Herein, a description will be given of components similar to those in FIG. 5, which shows the above prior art, while assigning the same symbols thereto.

Embodiment 1

Figure 1:
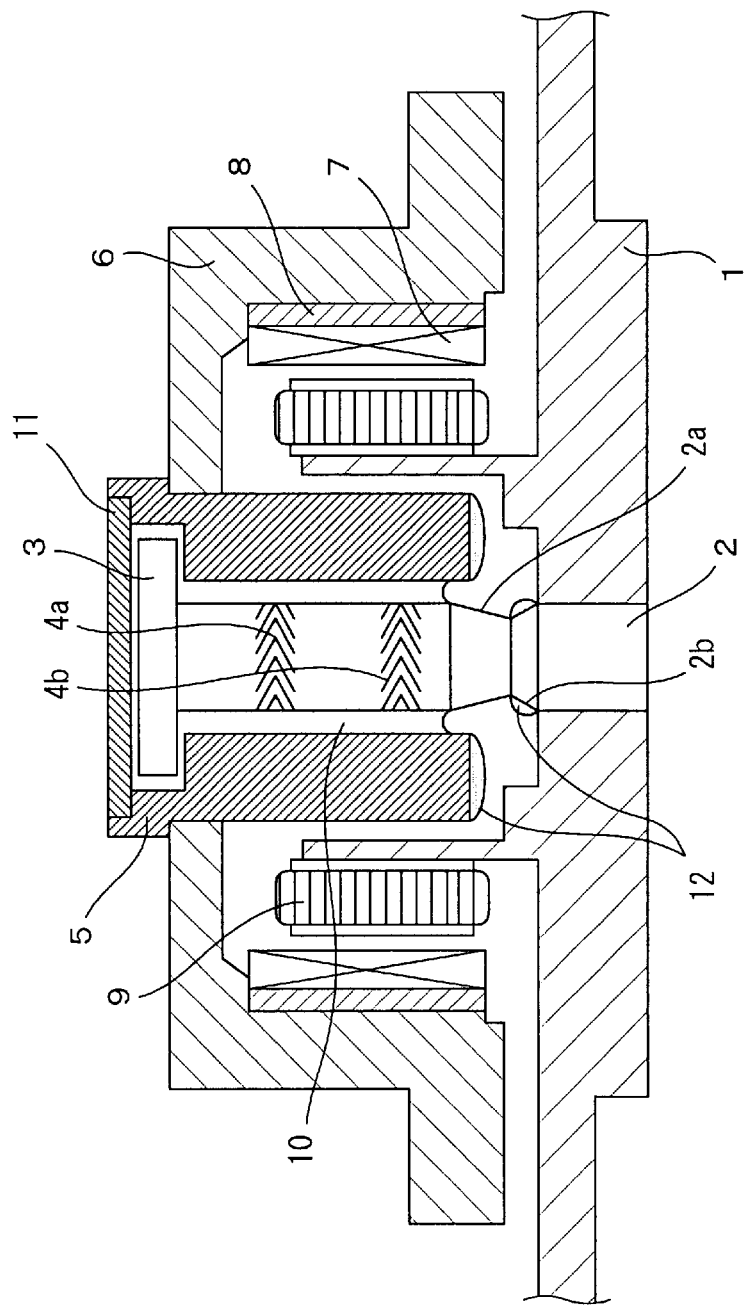
FIG. 1 is a longitudinal section of a fluid bearing unit according to Embodiment 1 of the present invention.
Figure 5:
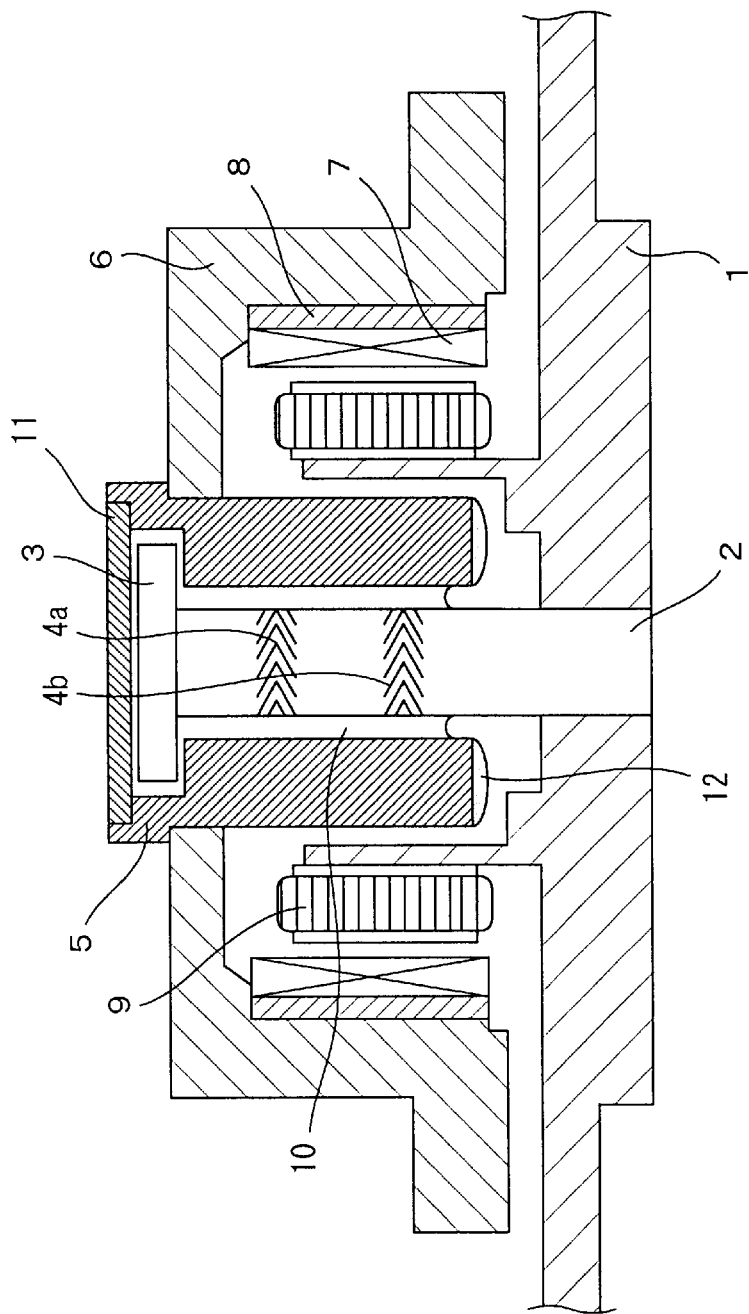
FIG. 5 is a longitudinal section of a prior-art fluid bearing unit.

As shown in FIG. 1, in a fluid bearing unit constructed similarly to that of FIG. 5, taper portions 2a and 2b are formed on the base end portion of a stationary shaft 2, and an oil repellent film 12 is coated on the end face of a sleeve 5 in the vicinity of the gas-liquid interface of a lubricant 10 and on the taper portion 2b.

In terms of the fluid bearing unit constructed as in the above, the present inventor has focused on the critical surface tension, which is a peculiar physical characteristic, as an index of repelling ability of the oil repellent film 12 and provided surface tension of the lubricant 10 to be greater than the critical surface tension of the oil repellent film 12 by an appropriate value, and thereby discovered that a leak of the lubricant 10 can be prevented by maintaining repelling ability of the oil repellent film 12 despite a rise in temperature with use in a high temperature range and the realization of high-speed rotation.

Herein, the reason why the critical surface tension has been used as an index of repelling ability of the oil repellent film 12 is because, in general, in a case where the surface energy, that is, the surface tension of a solid is smaller than the surface tension of a liquid on a solid-liquid interface, the solid does not easily become wet with the liquid and surface tension measurement of the solid is difficult. Moreover, when the contact angle indicated by a homologous series of organic liquid compounds on the solid surface is provided as $\theta$ and surface tension of this liquid is provided as $\gamma$, a linear relationship can be obtained between $\cos\theta$ and $\gamma$. With this linear relationship, the critical surface tension results in a value of $\gamma$ corresponding to $\theta=0$, that is, $\cos\theta=1$.

Concretely, a fixed amount of the lubricant 10 was dropped on the oil repellent film 12 to examine the relationship between the surface tension of the lubricant 10 and the critical surface tension of the oil repellent film 12, and after an elapse of a fixed time, the relationship between the contact angle of the lubricant 10 and oil repellent film 12 and the difference between the surface tension of the lubricant 10 and critical surface tension of the oil repellent film 12 was measured under a 20° C. ambient atmosphere.

Since the lubricant 10 is retained in the bearing due to its surface tension, for preventing leaking or oozing from the bearing, it is desirable that the surface tension is high. Therefore, the lubricant 10 containing a constituent of at least one of a hydrocarbon base and an ester base, which have been conventionally used, was used. As the oil repellent film 12, a fluorine-based oil repellent film 12 was used.

Figure 2:
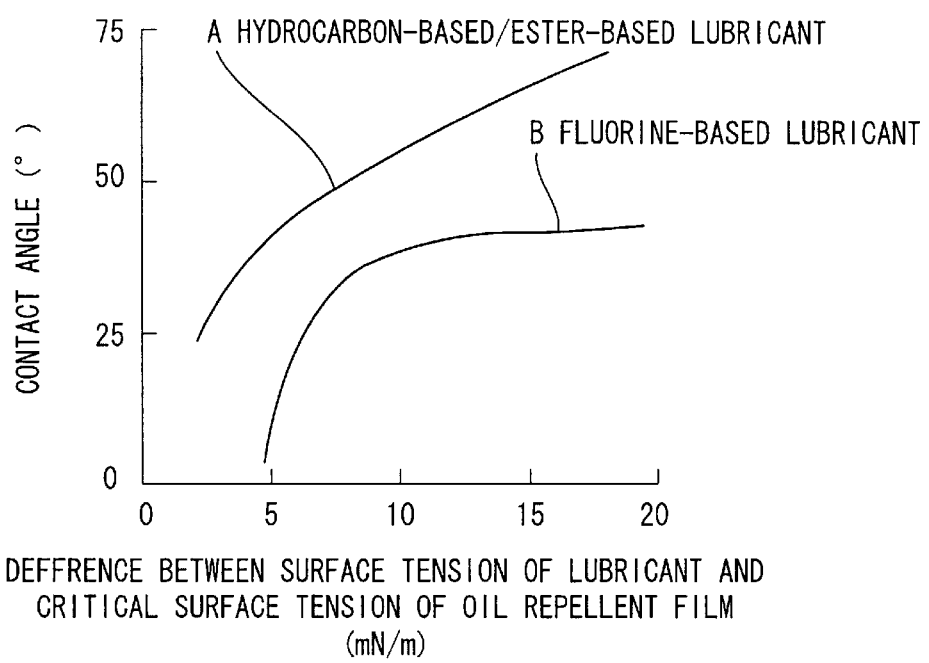
FIG. 2 is a measurement diagram showing a relationship between surface tension of a lubricant and critical surface tension of an oil repellent film according to the same embodiment.

Measurement results thus obtained are shown in FIG. 2. Herein, solid line A shows a measurement result in a case where a hydrocarbon-based and ester-based lubricant 10 was used, and solid line B shows a measurement result in a case where a fluorine-based lubricant was used.

As shown with the solid line A, in the case where the hydrocarbon-based and ester-based lubricant 10 was used, when the difference between the surface tension and critical surface tension became smaller than the vicinity of 5 mN/m, the contact angle was sharply reduced and the repelling ability of the oil repellent film 12 was weakened.

Also, in the case of the fluorine-based lubricant 10, similar tendencies are recognized, wherein the contact angle was sharply reduced in a case where the difference between the surface tension and critical surface tension was smaller than the vicinity of 8 mN/m, and particularly, at 5 mN/m or less, the lubricant 10 became wet and expanded, showing no contact angle.

Reasons why contact angle characteristics are thus different between the hydrocarbon-based and ester-based lubricant 10 and fluorine-based lubricant 10 are unclear, however, since the lubricant 10 and the oil repellent film 12 are of the same type in the case where the fluorine-based lubricant 10 and the fluorine-based oil repellent film 12 are combined, both are easily harmonized due to mutual effects indicating affinity.

Furthermore, in the case where a silicone-based oil repellent film was used as the oil repellent film 12 measurement results almost identical to the above were obtained.

Accordingly, in the liquid bearing unit shown in FIG. 1, in the case where the lubricant 10 contains a constituent of at least one of a hydrocarbon-based oil and an ester-based oil and the oil repellent film 12 is a film of at least one of a fluorine base and a silicone base, by employing a construction where the surface tension of the lubricant 10 is set greater than the critical surface tension of the oil repellent film 12 by 5mN/m or more, repelling effects of the oil repellent film 12 are maintained despite a rise in temperature and high-speed rotation and the lubrication 10 is prevented from leaking, thus a highly reliable liquid bearing unit can be realized.

Moreover, in the case where the lubricant 10 is a fluorine-based lubricant, by setting the surface tension of this fluorine-based lubricant greater than the critical surface tension of the oil repellent film 12 by 8 mN/m or more, effects similar to the above can be obtained.

As the lubricant 10 containing a constituent of at least one of a hydrocarbon base and an ester base to be used in this embodiment, for example, lubricants based on mineral hydrocarbons, synthesized hydrocarbons such as poly alpha-olefins, esters such as monoesters, diesters, and polyolesters and the like can be mentioned. Since these lubricants 10 have well-balanced performance and a wide range of selection in kinematic viscosity and surface tension, arbitrary selection can be carried out according to purpose and use of the liquid bearing unit, and a single or mixed lubricant can be used.

As the fluorine-based lubricant 10 lubricants containing at least one of perfluoropolyether and perfluoropolyether derivatives which are excellent in heat resistance and chemical stability and also whose change in kinematic viscosity according to temperature is small can be preferably used.

In these lubricants 10 for the purpose of improving and complementing performance, to the extent that characteristics thereof are not lost, additives such as oxidation inhibitors, extreme-pressure agents, oiliness agents, rust inhibitors, pour-point depressants, conductive fillers, metal deactivators, and viscosity index improvers may be added with an arbitrary combination.

As fluorine-based resins for forming the oil repellent film 12, polytetrafluoroethylene (PTFE), polyvinylidene fluoride (PVDF), polyvinyl fluoride (PVF), ethylene-tetrafluoroethylene copolymer (ETFE), ethylene-chlorotrifluoroethylene copolymer (ECTFE), polychlorotrifluoroethylene (PCTFE), tetrafluoroethylene-perfluoroalkylvinylether copolymer (PFA), tetrafluoroethylene-hexafluoropropylene copolymer (FEP) and the like can be mentioned. A part of these fluorine-based resins may be substituted with functional groups such as hydroxyl groups, carboxyl groups, amino groups, isocyanate groups, and epoxy groups. The aforementioned function groups may be used alone or mixed or a copolymer thereof may be used.

As commercially available fluorine-based resins, water repellents or oil repellents including FLUORAD FC (registered trademark) manufactured by SUMITOMO 3M Limited, SUMIFURUNON FP (registered trademark) manufactured by SAKATA INX CORPORATION, and CYTOP (registered trademark) manufactured by Asahi Glass Co., Ltd. can be named. Among them, crystalline or non-crystalline perfluoro-based resins having lower critical surface tension can be particularly preferably used.

Moreover, as silicone-based resins for forming the oil repellent film 12 silicone resins including polydimethylsiloxane (PDMS) can be named, and silicone resins which have been partially denatured with ether, amine, epoxy, alkyd, phenyl, alkyl or the like may be used. In addition, similar to the fluorine-based resins, these may be used alone or in a mixed fashion, and ones having lower critical surface tension are preferable.

By providing the oil repellent film 12 as a coating film, which is formed by dissolving the above fluorine-based resin(s) or silicone-based resin(s) in a coating solution, coating this solution on appointed spots including the lower end face of the sleeve 5 and the taper portion 2b of the stationary shaft 2, and drying the spots at room temperature or by heating, the processes and equipment can be simplified compared to a case where surface reforming is carried out by fluorinating plasma treatment or the like, therefore formation can be easily carried out at low cost.

A method for coating the coating solution can be arbitrarily selected from a spin coating, a dip coating, a spray coating, a transfer coating, a potting coating, and a brush coating according to the size and shape of a member.

Furthermore, by dispersing and dissolving various materials into the coating solution, other functions can also be easily added after the oil repellent film 12 has been formed. Furthermore, coloring may also be applied to the above oil repellent film 12 with black, white, or another color by impregnating a pigment or a dye for distinguishing from the stationary shaft 2 or the sleeve 5. Furthermore, for uniformly dispersing various materials into the coating solution, a dispersing agent may be added. It is desirable that additives other than the resin constituent are kept to a minimum necessary within the range so as not to decrease oil repellent performance and adhesion of the oil repellent film.

Hereinafter, examples and comparative examples will be indicated as concrete examples according to this Embodiment 1.

EXAMPLE 1

In the liquid bearing unit shown in FIG. 1, a polyolester lubricant having surface tension of 34 mN/m was used as the lubricant 10. This surface tension is a value measured at 20° C. by means of a DuNouy surface tensiometer or the like.

In addition, a fluorine-based coating solution, in which a commercially available perfluoro-based fluorocarbon resin having critical surface tension of 19 mN/m has been dissolved, was coated on the lower end face of the sleeve 5 by a transfer method, and on the taper portion 2b of the stationary shaft 2, by a spray method, respectively, and oil repellent films 12 were formed by heating and drying.

The liquid bearing unit constructed as in the above was continuously rotated for 1000 hours at a number of revolutions of 7200 rpm in a high temperature environment at 80° C.

Thereafter, the liquid bearing unit was disassembled and the lower end face of the sleeve 5 was observed and evaluated with "o" for a result where no leak of the lubricant 10 was found on the end face of the sleeve 5 as shown in FIG. 3(*a*), and with "x" for a result where a leak and/or ooze 17 were observed on the end face of the sleeve 5 as shown in FIG. 3(*b*).

The evaluation results are shown in Table 1.

TABLE 1

| | Lubricant | | Oil repellent film | | |
|---|---|---|---|---|---|
| | Type | Surface tension (mN/m) | Type | Critical surface tension (mN/m) | Evaluation |
| Example 1 | Polyolester | 34 | Perfluoro-based fluorocarbon resin (commercial product) | 19 | ○ |
| Example 2 | Polyolester | 34 | Silicone-based polydimethylsiloxane | 24 | ○ |
| Example 3 | Fluorine-based straight chain-type Perfluoropolyether | 21 | Perfluoro-based fluorocarbon resin (commercial product) | 12 | ○ |
| Comparative example 1 | Fluorine-based straight chain-type Perfluoro-Polyether | 23 | Perfluoro-based fluorocarbon resin (commercial product) | 19 | X |
| Comparative example 2 | Hydrocarbon | 22 | Perfluoro-based fluorocarbon resin (commercial product) | 19 | X |

EXAMPLE 2

A polyolester lubricant having surface tension of 34 mN/m was used as the lubricant 10. The oil repellent film 12 was formed with silicone-based polydimethylsiloxane having critical surface tension of 24 mN/m.

Conditions other than the above were provided similarly to those of Embodiment 1, and the end face of the sleeve 5 was observed.

Evaluation results obtained are shown in Table 1.

EXAMPLE 3

A fluorine-based straight chain-type perfluoropolyether lubricant having surface tension of 21 mN/m was used as lubricant 10. The oil repellent film 12 was formed with a commercially available perfluoro-based fluorocarbon resin having critical surface tension of 12 mN/m.

Conditions other than the above were provided similarly to those of Embodiment 1, and the end face of the sleeve 5 was observed.

Evaluation results obtained are shown in Table 1.

COMPARATIVE EXAMPLE 1

A fluorine-based straight chain-type perfluoropolyeter lubricant having surface tension of 23 mN/m was used as the lubricant 10. The oil repellent film 12 was formed with a commercially available perfluoro-based fluorine-based resin having critical surface tension of 19 mN/m.

Conditions other than the above were provided similarly to those of Embodiment 1, and the end face of the sleeve 5 was observed.

Evaluation results obtained are shown in Table 1.

COMPARATIVE EXAMPLE 2

A hydrocarbon lubricant having surface tension of 22 mN/m was used as the lubricant 10. The oil repellent film 12 was formed with perfluoro-based fluorine-based resin having critical surface tension of 19 mN/m.

Conditions other than the above were provided similarly to those of Embodiment 1, and the end face of the sleeve 5 was observed.

Evaluation results obtained are shown in Table 1.

Figure 3A:
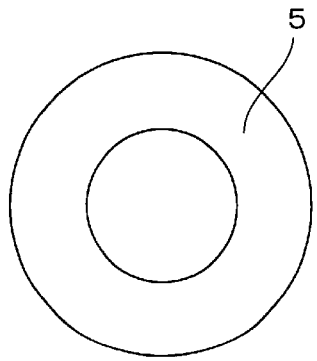
FIG. 3 are schematic views of sleeve end faces in examples and comparative examples according to the same embodiment.

In Example 1 and Example 2, with the combination where the lubricant 10 was a hydrocarbon-based oil or an ester-based oil and the oil repellent film 12 was a film of at least one of a fluorine base and a silicone base, the surface tension of the lubricant 10 was greater than the critical surface tension of the oil repellent film 12 by 5 mN/m or more. Therefore, even though high-speed rotation was carried out in a high temperature environment, no leaking or oozing of the lubricant 10 was observed on the end face of the sleeve 5 as shown in FIG. 3(a).

In Example 3, in the case where the lubricant 10 was a fluorine-based lubricant, the surface tension of this fluorine-based lubricant is made greater than the critical surface tension of the oil repellent film 12 by 8 mN/m or more. Therefore, similar to the above, no leaking or oozing of the lubricant 10 was observed on the end face of the sleeve 5.

Figure 3B:
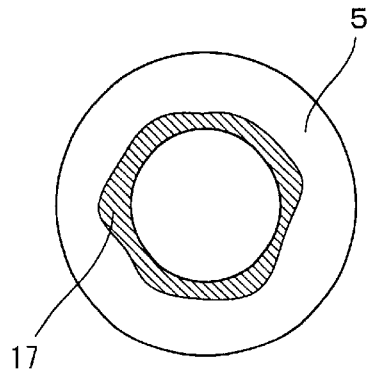

In Comparative example 1, the difference between the surface tension of the fluorine-based lubricant 10 and the critical surface tension of the fluorine-based oil repellent film 12 was smaller than 8 mN/m, which is the range of the present invention. Therefore, as shown in FIG. 3(b), ooze 17 of the lubricant 10 was observed on the end face of the sleeve 5.

In Comparative example 2, the difference between the surface tension of the hydrocarbon-based lubricant 10 and the critical surface tension of the fluorine-based oil repellent film 12 was smaller than 5 mN/m, which is the range of the present invention. Therefore, as shown in FIG. 3(b), ooze 17 of the lubricant 10 was observed on the end face of the sleeve 5.

Herein, in both cases where, as in Comparative example 1, the difference between the surface tension of the fluorine-based lubricant 10 and the critical surface tension of the fluorine-based oil repellent film 12 was smaller than 8 mN/m and where, as in Comparative example 2, the difference between the surface tension of the hydrocarbon-based lubricant 10 and the critical surface tension of the fluorine-based oil repellent film 12 was smaller than 5 mN/m, the contact angle shown in FIG. 2 was approximately 40° or less. Based on this result, as well, it can be understood that oozing of the lubricant 10 is easily generated from the bearing under such conditions.

Embodiment 2

Figure 4:
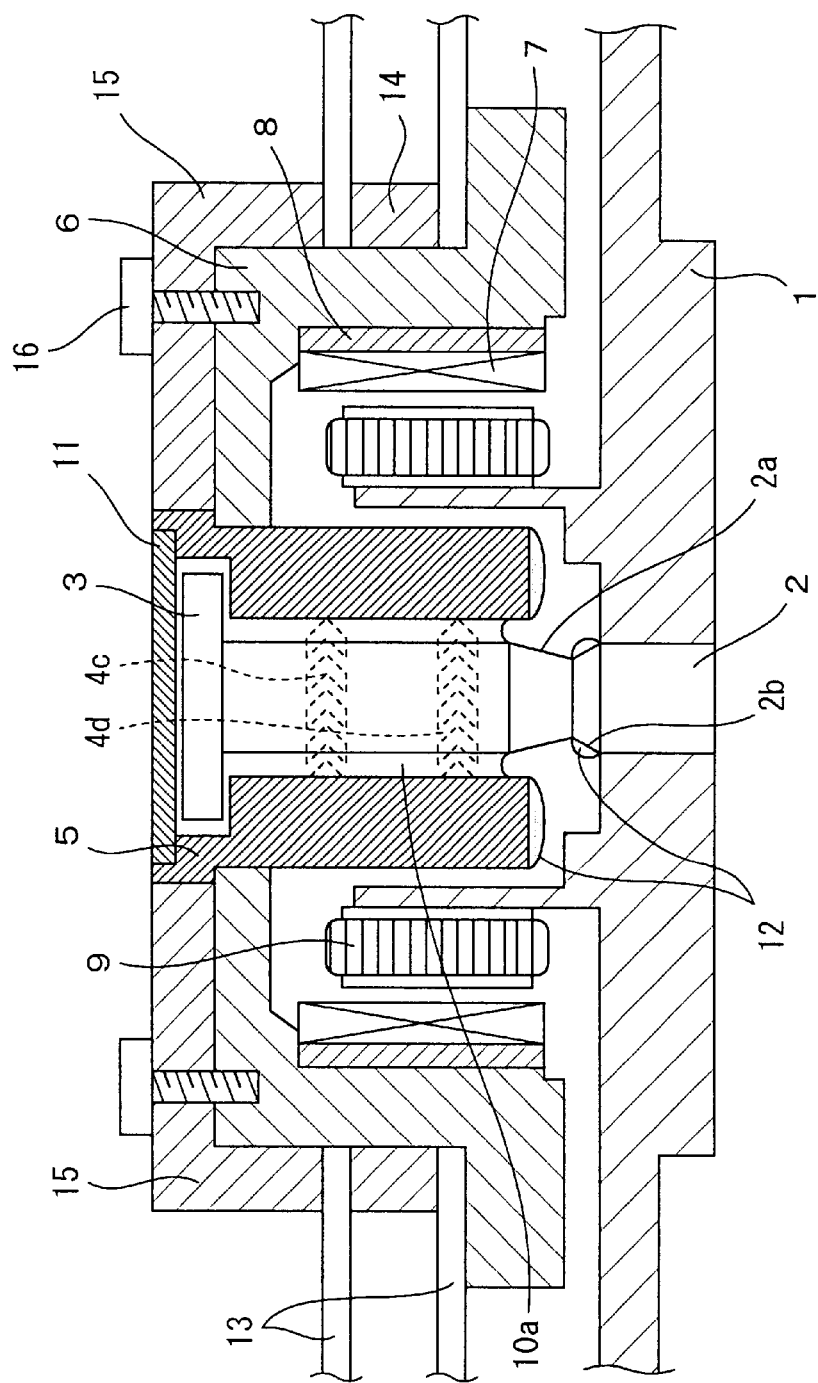
FIG. 4 is a longitudinal section of a magnetic disk device according to Embodiment 2 of the present invention.

FIG. 4 shows Embodiment 2 of the present invention.

In this Embodiment 2, by using a liquid bearing unit according to the above embodiment, mounting of the liquid bearing unit on a magnetic disk device can be realized.

As shown in FIG. 4, in the liquid bearing unit constructed similarly to that of FIG. 1, two magnetic disks 13 are set via a spacer 14 on a hub 6 and are fixed with a clamp 15 and screws 16. A lubricant (unillustrated) is coated on the magnetic disks 13. 4c and 4d denote dynamic pressure-generating grooves formed on the inner surface side of a sleeve 5.

As the liquid bearing unit, of the liquid bearing units according to the above embodiments, a liquid bearing unit which has been constructed so that the lubricant 10 is a fluorine-based lubricant 10 the oil repellent film 12 is a fluorine-based film, and the surface tension of the fluorine-based lubricant 10 is greater than the critical surface tension of the oil repellent film 12 by 8 mN/m or more can be used.

As the fluorine-based lubricant 10 fluorine-based lubricants similar to those of the above embodiment can be used, and, for example, perfluoropolyether, perfluoropolyether derivatives and the like can be preferably used. Of these, a fluorine-based lubricant containing straight chain-type perfluoropolyether whose change in kinematic viscosity according to temperature is small and which is higher in heat resistance is preferably employed as the main constituent. As commercially available fluorine-based lubricants which employ the straight chain-type perfluoropolyether as the main constituent, Fomblin M, Z (registered trademark) manufactured by Ausimont KK, Demnum S (registered trademark) manufactured by DAIKIN INDUSTRIES, Ltd. and the like can be mentioned, however, fluorine-based lubricants which employ a side chain-type perfluoropolyether as the main constituent may be used. These may be used alone, in a mixed fashion, or by denaturing a part thereof with functional groups such as hydroxyl groups, carboxyl groups, isocyanate groups, and ester groups.

Also, as the fluorine-based film for forming the oil repellent film 12 a fluorine-based film similar to that of the above embodiment can be used as long as the critical surface tension thereof is smaller than the surface tension of the lubricant 10 by 8 mN/m or more, however, a fluorine-based film whose critical surface tension is 20 mN/m or less and is as small as possible so as to be able to make a great difference from the surface tension of the fluorine-based lubricant 10 is preferable. In the present invention, it is necessary that the difference between the surface tension of the fluorine-based lubricant 10 and critical surface tension of the fluorine-based film is 8mN/m or more, and preferably, 10 mN/m or more. Furthermore, if the difference between both is 10 mN/m or more, near maximum repelling ability can be obtained.

In the magnetic disk device constructed as in the above, both the fluorine-based film for forming the oil repellent film 12 and fluorine-based lubricant 10 are of the same type as the fluorine-based lubricant which has been applied to the surface of the magnetic disks 13. Therefore, a problem such that, as in the case where the silicone-based oil repellent film 12 was used, polysiloxane and the like which adsorbs to the magnetic disks 13 or the head causes motion failure is eliminated, thus highly reliable and clean driving can be realized.

Herein, in the above respective embodiments, the description has been given by raising, as an example, a liquid bearing unit where one end of the shaft portion thereof has been fixed. However, the present invention is not limited hereto, and similar effects can also be obtained with a liquid bearing device where both ends are fixed, in a case where the shaft portion is provided as a rotator, with a liquid bearing device where the inner holes of the sleeve are opened to both sides and the like, as well. In addition, two types or more of oil repellent films 12 which are different in critical surface tension, may be formed on both of the sleeve 5 and the rotating shaft.

As has been described above, the present invention provides a liquid bearing unit in which a lubricant is filled between a shaft portion and a rotator which is rotatably supported by this shaft portion and an oil repellent film for preventing the lubricant from leaking is formed on the shaft portion or rotator in the vicinity of a gas-liquid interface of the lubricant, wherein the lubricant contains a constituent of at least one of a hydrocarbon-based oil and an ester-based oil, the oil repellent film is a film of at least one of a fluorine base and a silicone base, and surface tension of the lubricant is made greater than the critical surface tension of the oil repellent film by 5 mN/m or more, whereby, even during use in a high temperature range or in high-speed rotation, a leak of the lubricant can be satisfactorily prevented by maintaining repelling ability of the oil repellent film, thus a highly reliable liquid bearing unit can be realized.

In addition, in the case where the lubricant is a fluorine-based lubricant, by making the surface tension of this fluorine-based lubricant greater than the critical surface tension of the oil repellent film by 8 mN/m or more, effects similar to the above can be obtained.

In addition, the present invention provides a magnetic disk device mounted with a liquid bearing unit in which a lubricant is filled between a shaft portion and a rotator which is rotatably supported by this shaft portion and an oil repellent film for preventing the lubricant from leaking is formed on the shaft portion or rotator in the vicinity of a gas-liquid interface of the lubricant, wherein the lubricant is a fluorine-based lubricant, the oil repellent film is a fluorine-based film, and surface tension of the lubricant is made greater than the critical surface tension of the oil repellent film by 8 mN/m or more. Thus, it becomes possible to apply the liquid bearing unit to a magnetic disk device for which the same has not conventionally been able to be used.

What is claimed is:

1. A liquid bearing unit in which a lubricant is filled between a shaft portion and a rotator which is rotatably supported by this shaft portion and an oil repellent film for preventing the lubricant from leaking is located on the shaft portion or rotator in the vicinity of a gas-liquid interface of the lubricant, wherein said lubricant comprises a constituent selected from the group consisting of a hydrocarbon-based oil and an ester-based oil, said oil repellent film is a film comprising a base selected from the group consisting of a fluorine base and a silicone base, and surface tension of said lubricant is greater than the critical surface tension of said oil repellent film by 5 mN/m or more.

2. A liquid bearing unit in which a lubricant is filled between a shaft portion and a rotator which is rotatably supported by this shaft portion and an oil repellent film for preventing the lubricant from leaking is located on the shaft portion or rotator in the vicinity of a gas-liquid interface of the lubricant, wherein said lubricant is a fluorine-based lubricant, and surface tension of said lubricant is greater than the critical surface tension of said oil repellent film by 8 mN/m or more.

3. A liquid bearing unit as set forth in claim 2, wherein the fluorine-based lubricant comprises a material selected from the group consisting of perfluoropolyether and perfluoropolyether derivatives.

4. A liquid bearing unit as set forth in claim 2, wherein the oil repellent film is a coating film.

5. A liquid bearing unit as set forth in claim 4, wherein the oil repellent film is a fluorine-based film.

6. A liquid bearing unit as set forth in claim 2, wherein the oil repellent film is a fluorine-based film.

7. A magnetic disk device mounted with a liquid bearing unit in which a lubricant is filled between a shaft portion and a rotator which is rotatably supported by this shaft portion and an oil repellent film for preventing the lubricant from leaking is located on the shaft portion or rotator in the vicinity of a gas-liquid interface of the lubricant, wherein said lubricant is a fluorine-based lubricant, said oil repellent film is a fluorine-based film, and surface tension of said lubricant is greater than the critical surface tension of said oil repellent film by 8 mN/m or more.

* * * * *